(12) United States Patent
Henry

(10) Patent No.: US 6,406,630 B1
(45) Date of Patent: Jun. 18, 2002

(54) CURTAIN ASSEMBLY FOR WASTE TREATMENT

(75) Inventor: Dick Peter Henry, Torwood (AU)

(73) Assignee: Fungi-Gulp Pty. Ltd., Clifton (AU)

( * ) Notice: Subject to any disclaimer, the term of this patent is extended or adjusted under 35 U.S.C. 154(b) by 0 days.

(21) Appl. No.: 09/555,669

(22) PCT Filed: Nov. 30, 1998

(86) PCT No.: PCT/AU98/00989

§ 371 (c)(1),
(2), (4) Date: Oct. 16, 2000

(87) PCT Pub. No.: WO99/28244

PCT Pub. Date: Jun. 10, 1999

(30) Foreign Application Priority Data

Dec. 1, 1997 (AU) .............................. PP0694

(51) Int. Cl.$^7$ .............................. C02F 3/04; C02F 3/34
(52) U.S. Cl. ................ 210/612; 210/615; 210/620; 210/622; 210/150; 210/177; 210/197; 210/201; 210/218; 210/534
(58) Field of Search ................ 210/612, 615, 210/620, 621, 622, 150, 197, 195.1, 201, 218, 252, 533, 534, 535, 177

(56) References Cited

U.S. PATENT DOCUMENTS

| | | | |
|---|---|---|---|
| 3,231,490 A | | 1/1966 | Fry |
| 3,301,401 A | * | 1/1967 | Hall |
| 3,313,533 A | * | 4/1967 | Powers |
| 3,402,103 A | * | 9/1968 | Amberg et al. |
| 3,617,541 A | * | 11/1971 | Pan |
| 4,416,993 A | * | 11/1983 | McKeown |
| 5,397,474 A | | 3/1995 | Henry |
| 5,830,355 A | * | 11/1998 | Harris |

FOREIGN PATENT DOCUMENTS

| | | |
|---|---|---|
| DE | 4213814 A1 | 10/1993 |
| FR | 2269498 | 11/1975 |
| GB | 1557473 | 12/1979 |

OTHER PUBLICATIONS

Derwent Abstract Accession No. 98–162860/15, of JP 10–028989 A (Feb. 3, 1998) (abstract only).

* cited by examiner

Primary Examiner—David A. Simmons
Assistant Examiner—Fred Prince
(74) Attorney, Agent, or Firm—Braman & Rogalskyj, LLP

(57) ABSTRACT

A waste treatment apparatus (10) including one or more vertically oriented curtains (11) each formed of mesh material having a minimal aperture size of 0.001 mm, means for applying liquid waste to said curtain(s) located above said curtain (17, 15) and collection means (20A) for collection of treated waste after passage through said one or more curtains (12). There is also provided a method of treatment of waste using the waste treatment apparatus.

29 Claims, 6 Drawing Sheets

CURTAIN ASSEMBLY FOR WASTE TREATMENT

Figure 1:
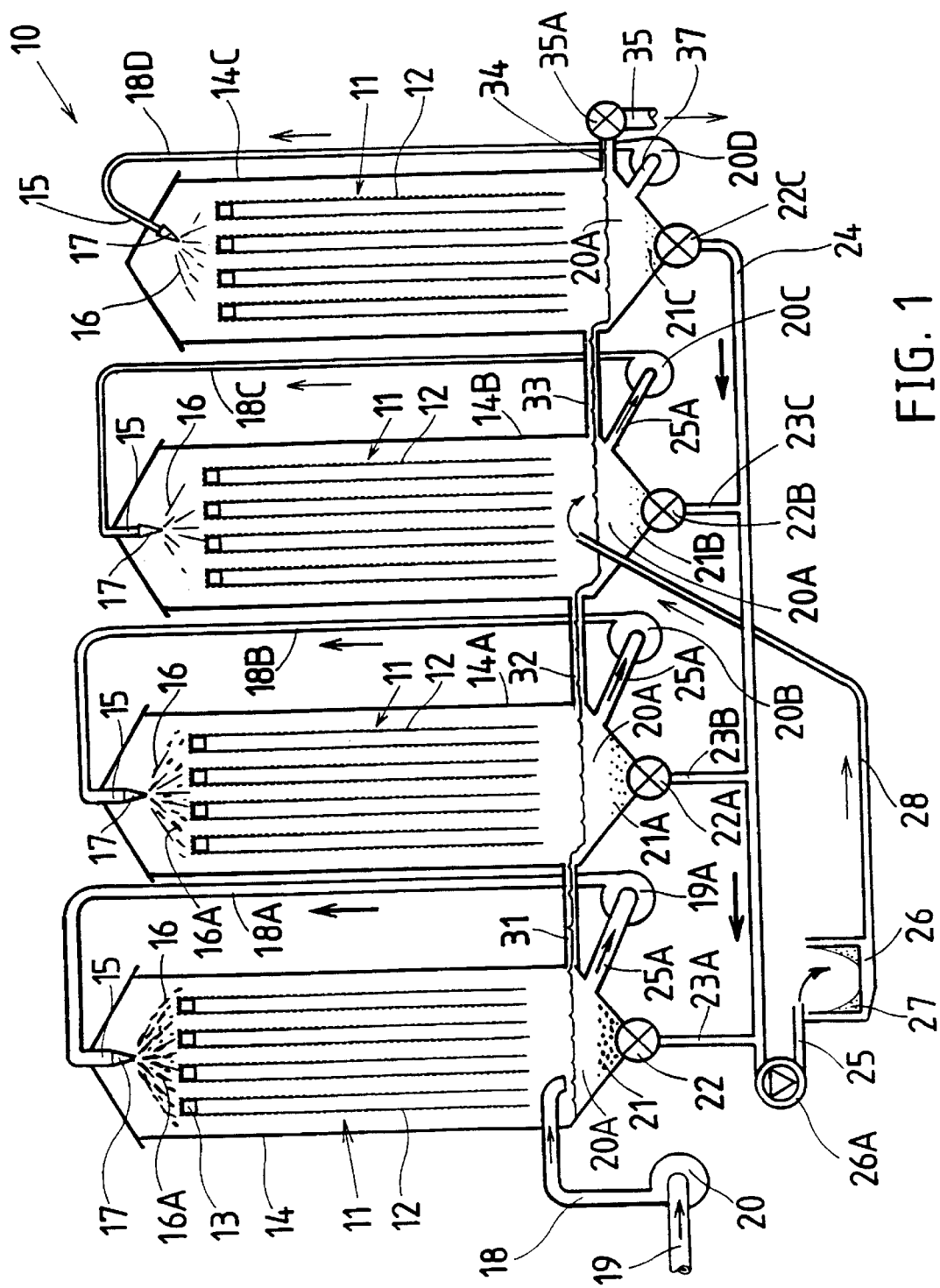

The present application is a 371 of International Patent Application No. PCT/AU98/00989, filed Nov. 30, 1998, which claims priority to Australian Patent Application No. PP 0694, filed Dec. 1, 1997.

FIELD OF THE INVENTION

THIS INVENTION relates to a curtain assembly for waste treatment which may be utilized for treatment of wastes, which include faeces from animals inclusive of piggeries, stockyards, cattle feedlots and the like, wastes from breweries, distilleries and fermentation processes and any other waste which may be metabolized by micro-organisms.

BACKGROUND OF THE INVENTION

Reference may be made to International Publication WO92/11210 which refers to treatment of wastes also utilizing a curtain assembly. In this prior art specification, there is described a process for treatment of biological waste which included the step of passing liquid waste downwardly through a substantially vertically orientated curtain formed of flexible reticulated cellular material, such as reticulated polyurethane foam, bonded to a reinforcing nylon cloth core. The curtains at laboratory scale were 2 m long and 0.1 m wide and liquid waste was pumped to the top of the curtain and subsequently trickled down through the curtain which had been previously inoculated with micro-organisms such as *Candida ingens* and *Geotrichum fragrans*. Such micro-organisms were pellicle-forming oxidative organisms which were able to obtain their oxygen directly from the atmosphere as described in Henry et al., 1983, European J. Appl. Microbiol. Biotechnol. 18 109–113.

The process of WO92/11210 was efficacious in use and could be utilized for treatment of a wide variety of waste as described above and, in particular, strong waste which is generated by commercial enterprises, such as breweries, distilleries and piggeries, milk processing and grease trap waste treatment centres.

However, it has now been found in practice that the use of flexible reticulated polyurethane foam for waste treatment as described above was unsatisfactory and had certain disadvantages. One disadvantage was that very finely divided particulate matter or silt, which was derived from lignocellulose, tended to collect within the cells of the polyurethane foam and filled up the cells denying the filamentous micro-organisms access to atmospheric oxygen which was essential to the effective cultivation of such micro-organisms. Such silt also reduced the effective surface area of the foam which could be occupied by the micro-organism. It was therefore frequently necessary to wash the fine silt off the polyurethane foam and this disrupted commercial operation of the polyurethane foam as it was then necessary to reinoculate the curtain with the filamentous micro-organism.

Another disadvantage in relation to reticulated polyurethane foam was that such foam was frequently used by flies of the family Psychodidae, alternatively known as "moth wing flies" to lay their eggs and the resulting larvae also disrupted satisfactory use of the polyurethane foam as a waste treatment curtain.

SUMMARY OF THE INVENTION

It therefore is an object of the invention to provide waste treatment apparatus and a method of waste treatment using a curtain assembly to alleviate one or more of the aforementioned disadvantages.

The invention, therefore, in one aspect, provides a method of waste treatment which includes the steps of:
(i) inoculating one or more vertically oriented curtains formed of mesh material having a minimal aperture size of 0.1–5.0 mm with micro-organisms which are pellicle forming oxidative organisms so as to form a microbial lawn or mat adhering to the curtain;
(ii) passing waste liquid downwardly through the curtain; and
(iii) collecting treated waste liquid below the curtain.

The invention, in another aspect, refers to a waste treatment apparatus including:
(i) one or more vertically oriented curtains each formed of flexible mesh material having an aperture size of 0.1–5.0 mm;
(ii) means for applying liquid waste to said curtain(s) located above said curtain; and
(iii) collection means for collection of treated waste after passage through said one or more curtains.

The aperture size of the mesh is critical to the successful performance of the invention and depends upon a unique relationship between pellicle forming micro-organisms, the stream of waste liquid passing down the mesh on both sides thereof and the degree of oxygen access to the pellicle formers. If the aperture size is too small, i.e. less than 0.1 mm, then the pellicle formers will not grow successfully because of insufficient oxygen access and if the aperture size is too large, i.e. greater than 5 mm, then the pellicle formers will tend to have difficulty in forming a lawn and fall off the curtain. The mesh material may comprise knitted, woven or knotted fabric with open spaces between threads of the fabric which have the aforementioned aperture sizes.

However, it will also be appreciated that the mesh may also be formed from non-woven material or have any structure formed by intersection of threads running in one direction (i.e. "warp" threads) and threads running in another direction normal to the first direction (i.e. "weft" threads). However, it will be appreciated that the mesh threads can have any suitable pattern of intersection and thus form apertures or open spaces of rectangular, square, diamond shape, polygonal shape or even triangular shape.

Preferably, the mesh material is formed from commercial shadecloth obtainable, for example, under the trade marks "WEATHAMESH", "GEOTEX" and "SARLON" and may have product specifications having 50–90% UV cover factor. Usually shadecloth is obtainable commercially having a width of 1.83–3.66 m and other specifications may include weight of between 98–231 gms/m$^2$, courses per inch of between 8.5–20 and wales per inch of 6.25. Usually such shade cloth is formed from polymeric material.

A particularly preferred form of shadecloth used for Examples 1–4 hereinafter was "WEATHASHADE" shadecloth having 69.2% UV cover factor, 226 gms/m$^2$, 20 courses per inch, 6.25 wales per inch and 3.66 m wide.

The method of the invention suitably utilizes a curtain assembly comprising one, but more preferably, an array of spaced curtains which may be separated by a spacing of between 30–100 mm. Each curtain may be suspended by a support which may be of any suitable type but which may comprise a plurality of spaced bars oriented in a horizontal plane wherein a length of curtain is draped over an adjacent bar. However, it will be appreciated that any other support may be utilized, such as a support frame or support plate having spaced slots for supporting an individual curtain.

Preferably, each curtain in a curtain array is spaced from each other by spacing means, such as individual spacers, which retain each curtain in a fixed orientation so as to maintain the aforementioned spacing of 30–100 mm. Such spacers may be of any suitable type and comprise, for example, tubes or rods which are attached to a common support, such as a cord or wire.

It is also preferred that each curtain be tensioned adjacent a bottom edge so as to maintain each curtain in a taut and substantially planar condition. One form of tensioning means may include clamps which clamp each of the bottom edges of a respective curtain to an adjacent support. Alternatively, and more preferably, each of the curtains has a tie which is looped around or attached to a support. The tie may be attached to an adjacent curtain in any suitable manner, such as by passing through apertures in the curtain.

The waste to be treated by the method of the invention is suitably transported to the top of the curtain assembly by an inlet conduit or conduits by a pump of suitable type and be applied to the top of the curtains in the form of a jet or pressurized spray. The waste, in the form of a liquid (which term also includes "slurry" or "suspension") may subsequently percolate down the curtain through the thick microbial lawn of micro-organisms.

It is also found efficacious in the method of the invention that pressurized air is passed horizontally between adjacent curtains which may be heated to a suitable cultivation temperature for propagation of the micro-organisms which may comprise from 28–42° C. and, more suitably, 32° C. Such pressurized air may be applied from an inlet manifold having a plurality of spaced ports and be received by an exhaust manifold also having a plurality of spaced exhaust ports. Suitably, the pressurized air is applied along the height of each of the curtains in a particular array.

Preferably, each array of curtains is accommodated within a housing which may be provided with an inlet through which the inlet conduit(s) transporting waste may project. Preferably, the or each inlet conduit may have a nozzle or jet to apply the waste in a spray to the curtain array wherein the spray may be entrained with solid particulate waste.

In a preferred embodiment, there may be a plurality of housings which are spaced from each other whereby waste may be transferred sequentially from a first housing and then through one or more intermediate housings and lastly through a final housing. In this embodiment, each of the housings may have a suitable collection means in the form of a collection compartment or drainage compartment which are each preferably arranged on a slope or at successively lower heights so that liquid waste in one drainage compartment may then be transferred to an adjacent housing by gravity. Each of the housings may be provided with inlet conduits for circulation of waste as well as suitable outlet or drain conduits.

BRIEF DESCRIPTION OF THE DRAWINGS

Reference may now be made to a preferred embodiment of the present invention wherein:

FIG. 1 is a schematic view of one embodiment of waste treatment apparatus in accordance with the invention;

FIG. 2 is a schematic view of another embodiment of waste treatment apparatus in accordance with the invention;

FIG. 3 is a perspective view of a curtain assembly for use with the embodiment of FIG. 1 or FIG. 2;

FIG. 4 is a schematic view of a closed circuit for passage of pressurized air through the waste treatment apparatus of FIG. 1 or FIG. 2;

FIG. 5 is a graph showing treatment of brewery waste water which is referred to in Example 2 on a chronological time basis concerning COD input/output against COD; and FIG. 6 is a similar graph to FIG. 5 but forming a continuation of the treatment of brewery waste water as described in Example 2.

DETAILED DESCRIPTION OF THE PREFERRED EMBODIMENT

In the drawings, the waste treatment apparatus 10 of FIG. 1 includes a plurality of curtain assemblies 11 each having a plurality of curtains 12 wherein each curtain 12 is suspended from a bar 13 of rectangular tubular cross section as shown wherein each curtain is draped around an associated bar 13. It will also be appreciated that bar 13 may have any suitable cross sectional shape, such as circular or polygonal. Each curtain assembly 11 is housed in a respective housing 14, 14A, 14B or 14C. Each housing includes a top inlet 15 wherein waste liquid 16 in the form of a spray and entrained with solid particles 16A is fed to an adjacent curtain assembly 11 through a feed nozzle or jet 17. In relation to housing 14, there is also provided an inlet conduit 18 for the passage of waste liquid from a feed conduit 19. Pump 20 is located at the junction of inlet conduit 18 and feed conduit 19 and is responsible for drawing liquid waste up inlet conduit 18 as shown by the arrows in full outline.

The waste liquid spray 16 is applied to curtains 12 as shown and percolates downwardly along curtains 12 wherein the waste liquid contacts a dense microbial lawn or mat formed by micro-organisms and which have been previously inoculated to each curtain 12. These micro- organisms spread over the surface of curtains 12 and are mainly pellicle- forming oxidative micro-organisms mainly comprising fungi and yeasts which are able to obtain their oxygen directly from the atmosphere as described in Henry et al., 1983, supra. The pellicle formers, therefore, may comprise *Geotrichum fragrans* and *Candida ingens*, for example.

There also may be present *Kloeckera lindneri* as well as other micro-organisms as discussed in International Publication W092111210. Usually the micro-organisms are self-sloughing and thus periodically fall off the curtain.

After passage through the curtain assembly 11, the waste liquid collects in a drain compartment 20A of the housing 14 and solid particles 21 also collect in drain compartment 20A. In housing 14, there is also provided a valve 22 which controls the flow of waste material inclusive of liquid and solid particles through drain conduit 23A and hence into manifold 24 wherein subsequently the waste material is passed into inlet conduit 25 en route to centrifuge 26 by the action of peristaltic pump 26A. A solid layer 27 of waste material may form in centrifuge 26 after rotation or operation thereof. The liquid which is then decanted from centrifuge 26 may be transferred into transfer conduit 28 which transfers the waste material to housing 14B as shown.

The waste liquid may also be transferred from drain compartment 20A to the top of housing 14 by the operation of pump 19A which forces the waste liquid up through transfer conduit 11A and subsequently through jet 17. Subsequently a similar procedure occurs in housing 14A as has already been described in relation to housing 14. In similar manner, the same procedure occurs in housings 14B and 14C for the additional processing of waste material as has already been described in relation to housing 14 and it will be noted that the number as well as the size of solid particles of waste material that occurs in each drain compartment 20A of housings 14, 14A, 14B and 14C is decreased when the waste material is processed by additional waste treatment apparatus which includes housings 14A, 14B and 14C which each enclose respective curtain assemblies 11. This is indicated by the collection of solid particles 21A in housing 14A, 21B in housing 14B and 21C in housing 14C. This feature is also indicated by the decreased number of particles 16A in each spray 16 which occurs at the top of each of the housings 14A, 14B and 14C.

It will also be noted that each of housings 14, 14A, 14B and 14C have successive drain compartments 20A which are each in a lower position when compared to the immediately preceding drain compartment 20A. Additional transfer conduits 18B, 18C and 18D are indicated. There is also provided additional pumps 20B and 20C which draw waste material into their associated transfer conduits 183 and 18C through outlet conduits 25A, and there is also provided additional pump 20D which draws waste material into its associated transfer conduit 18D through outlet conduit 37.

It will also be noted from the series of waste treatment housings 14, 14A, 14B and 14C that there is provided connection conduits 31, 32 and 33 between each of housings 14 and 14A, housings 14A and 14B, and housings 14B and 14C, whereby waste liquid from successive drain compartments 20A may be transferred into adjacent waste compartments 20A under the influence of gravity.

In the last drain compartment 20A, there is provided a further connection conduit 34 which transfers waste liquid into conduit 35 via valve 35A which contains liquid waste material treated by the waste treatment apparatus of the invention to a reservoir or collection receptacle for additional processing or use as may be required.

Manifold 24 also communicates with control valve 22C and with each of drain conduits 23A, 23B and 23C which have associated therewith control valves 22, 22A and 22B for passage of waste material into manifold 24 for passage to centrifuge 26 by the cation of peristaltic pump 26A.

Figure 2:
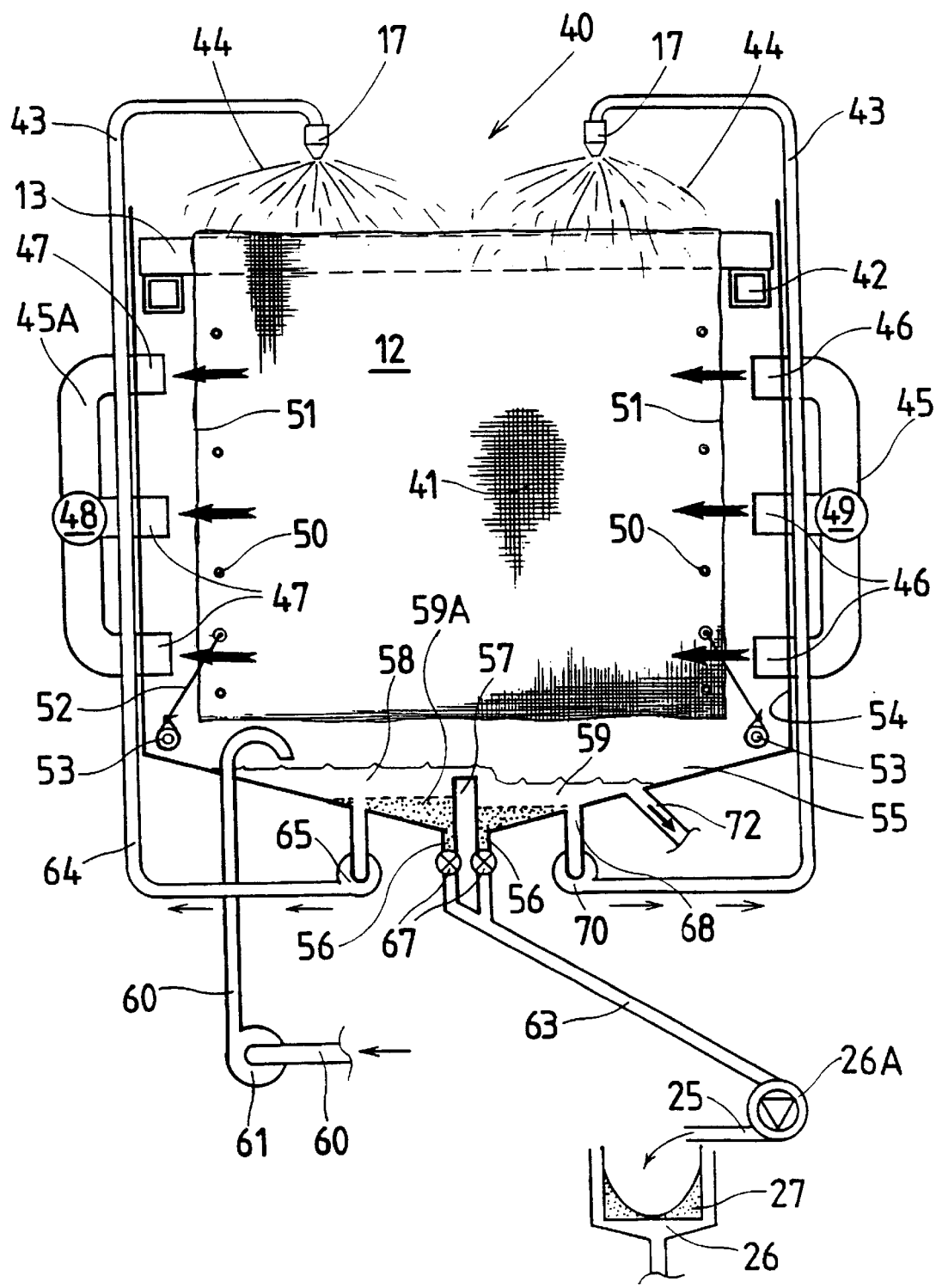

In the embodiment of FIG. 2, there is provided waste treatment apparatus 40 of the invention which includes a curtain 12 formed of mesh material 41 as described above which is suspended from a bar 13 which is also supported by support bars 42 at each end of bar 13. There is also provided a pair of inlet conduits 43 which are discharging waste material in the form of a spray 44 onto curtain 12 through a nozzle or jet 17. Waste treatment apparatus 40 also includes a pair of manifolds 45 and 45A whereby pressurized air may be passed across curtain 12 as indicated by the arrows in solid outline. Such pressurized air is passed from inlet ports 46 and is collected by exhaust ports 47. Each of manifolds 45 and 45A communicates with additional conduits 49 and 48.

Each curtain 12 is provided with a plurality of apertures 50 along each vertical edge 51 so that anchoring ties 52 may be attached thereto to keep curtains 12 in a substantially taut condition. Ties 52 are looped around support rods 53.

Curtains 12 are enclosed in a housing 54 which also includes a drain compartment 55. Drain compartment 55 includes a drain outlet 56 as well as baffle or weir 57. There is also provided waste liquid 58 on one side of weir 57 and waste liquid 59 on the other side. There is also shown particles 59A.

There is also provided a feed conduit 60 having a pump 61 which draws waste material through feed conduit 60 into drain compartment 55. Waste liquid 58 may also flow through outlet 56 and into drain conduit 63 and thence to centrifuge 26 by the action of peristaltic pump 26A. It will be appreciated to a person skilled in the art that other means may be utilized instead of centrifuge 26 for removal of solid detritus such as filters. There is also provided valves 67 which each control flow of fluid through drain outlet 56 on either side of weir 57.

In relation to waste liquid 59, such liquid is passed into conduit 68 and into conduit 43 by the operation of pump 70 and into conduit 43 via conduit 64 by operation of pump 65. There is also provided conduit 72 for transfer of treated waste liquor to a collection zone (not shown).

Figure 3:
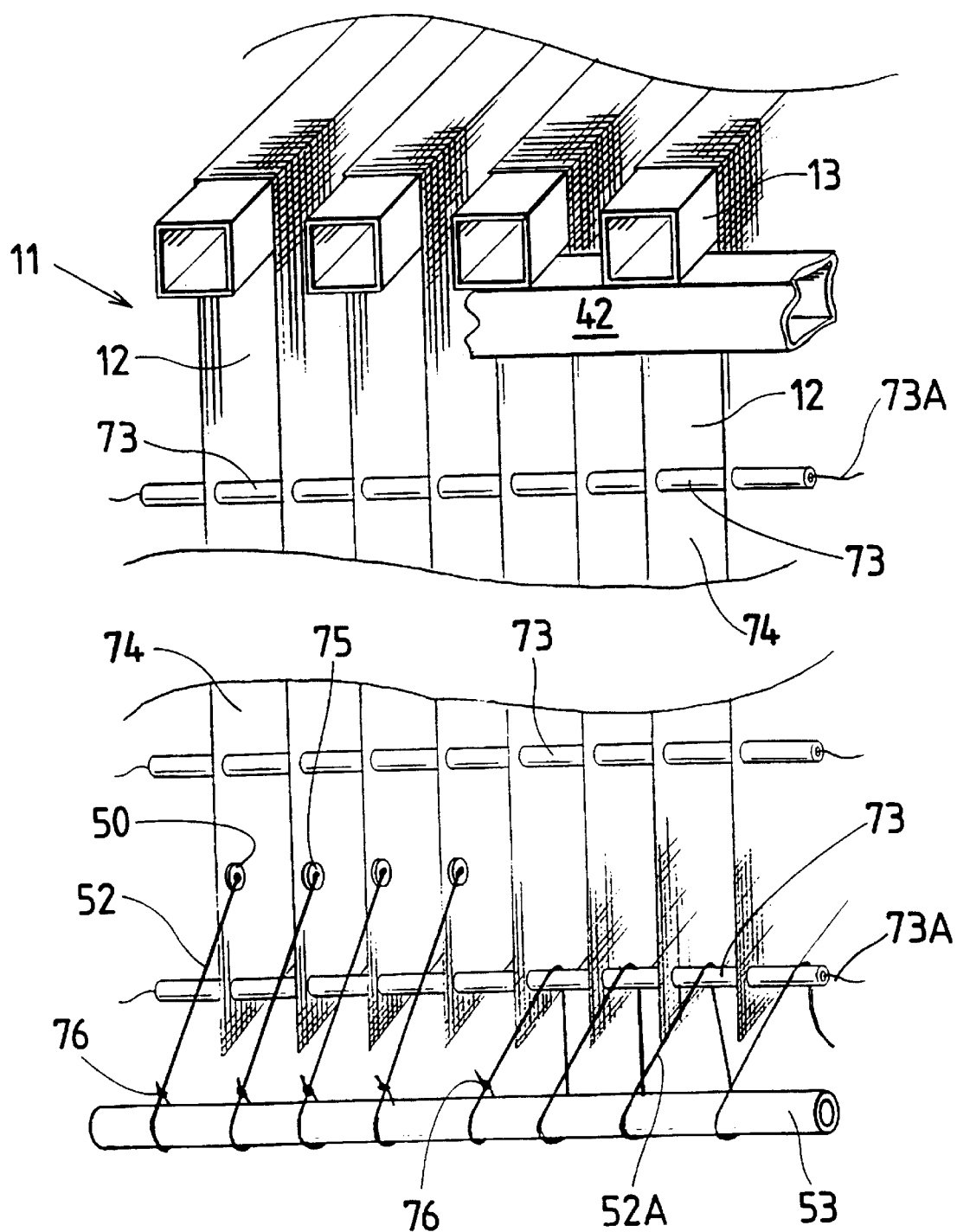

FIG. 3 shows a perspective view of curtain assemblies 11 which may be used in either waste treatment apparatus 10 shown in FIG. 1 or waste treatment apparatus 40 shown in FIG. 2. Curtain assemblies 11 show each curtain 12 separated by spacers 73 which maintain each curtain 12 spaced from each other to provided spaces 74 through which pressurized air may flow as shown in FIG. 2. Each spacer is supported on a common cord 73A. Each curtain 12 is draped over supports bars 13 as shown. The ties 52 pass through apertures 50 and are looped around support rod 53 and knotted at 76. The ties 52 also pass through associated washers 75 so as to inhibit wear and tear. The spacers 73 are also arranged in rows as shown for effective maintenance of spaces or gaps 74. A tie 52A may also be attached to spacers 73 if desired.

Figure 4:
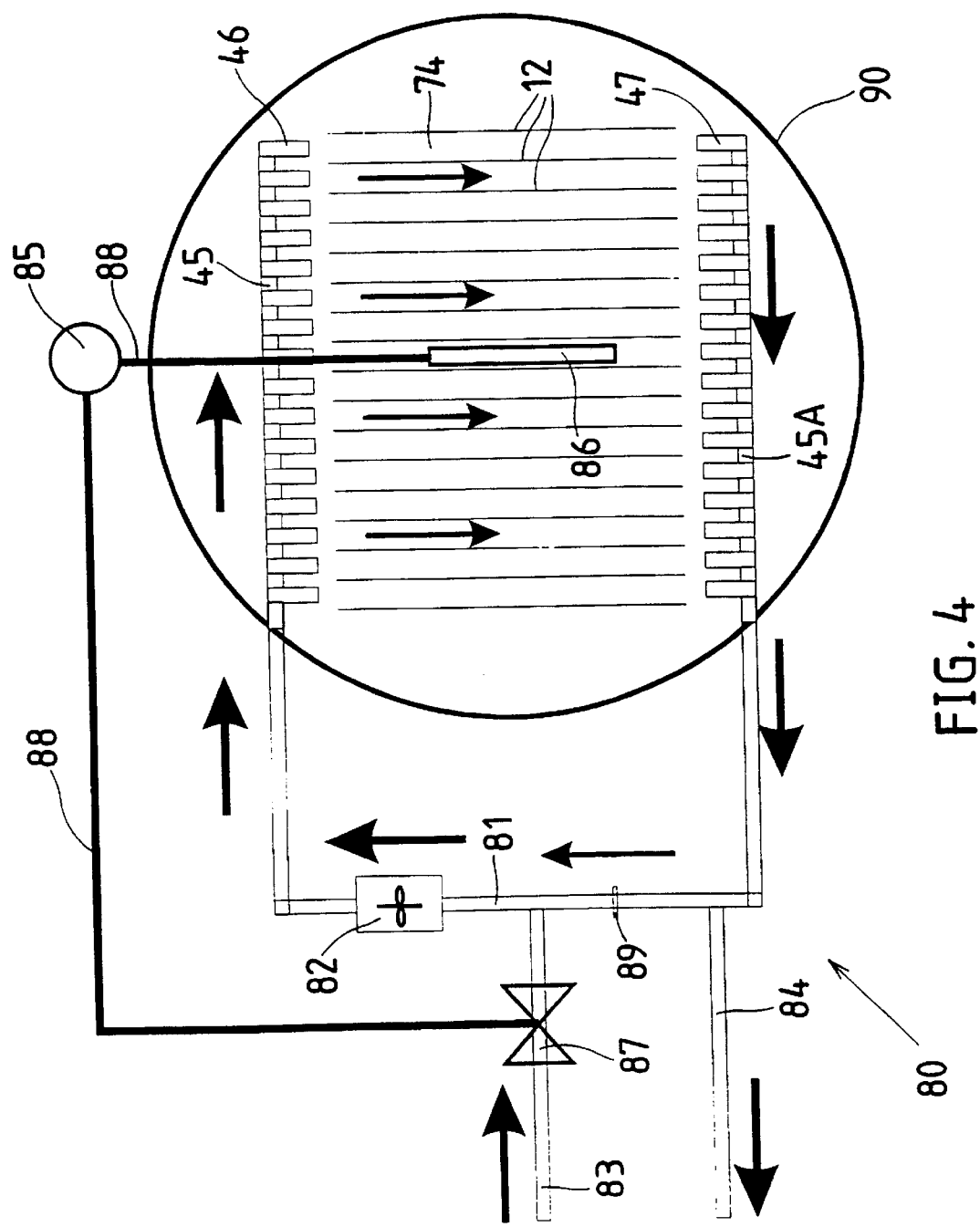

In FIG. 4, there is also shown a circuit 80 for flow of pressurized air through curtains 12. Circuit 80 includes inlet manifolds 45, exhaust manifolds 45A, inlet ports 46, exhaust ports 47, spacers 74 between curtains 12 and conduit 81 interconnecting manifolds 45 and 45A, recirculation fan 82, conduit 83 for flow of fresh air between curtains 12 and conduit 84 for flow of exhausted or spent air out of spacers 74. There also may be provided a temperature controller 85, temperature sensor 86 and regulating valve 87 for maintaining the desired temperature of 28–42° C. and, more suitably, 32° C. The temperature in this embodiment is controlled by evaporation and each of sensor 86, controller 85 and valve 87 are connected by conductors 88. There is also shown an orifice plate 89 which ensures that pressure at air inlet 83 is below atmospheric pressure and that pressure at outlet 84 is above atmospheric pressure. There is also shown cylindrical housing or silo 90.

As will be appreciated from the foregoing, the waste treatment method of the invention is designed to treat strong liquid biological wastes. It was originally based on a model of ruminant digestion as applied to piggery waste (urine, faeces, spilt feed). This process has been developed to pilot plant stage with a throughput of 1500 $Ld^{-1}$. The process is applicable to cattle feedlot waste, dairy cattle waste (milking parlour and holding yards) and human sewage. Other wastes susceptible to the treatment include waste produced in factories, such as breweries, fruit juice, carbonated drinks, cheese manufacture (treating whey) and other waste products of milk and butter fat processing, rum distilling, wine making, starch production, vegetable and fruit canning and grease trap waste treatment centres. Other biological wastes which could be treated by the process of the invention are produced from coffee bean processing and palm oil manufacture. This process may also be applied to the latex wastes from the early stages of rubber production.

An important feature of the process is that it can treat strong wastes without dilution with water.

Some advantages in the treatment of piggery wastes are as follows. The process:

(i) kills the bacterial pathogens in the waste;
(ii) assimilates carbon, nitrogen and phosphorus into yeast cells, or alternatively, can feed the fermented pathogen-free waste into a relatively small pond for conversion to methane;

(iii) removes the malodour from gases and liquids;

(iv) provides deodorized water for recycling as wash water;

(v) minimises water consumption for waste treatment;

(vi) requires a relatively small surface area to accommodate the plant;

(vii) can provide some single cell protein for nutritional uses;

(viii) produces stabilized lignocellulosic sludge for land disposal or incineration; and (ix) does not produce hydrogen sulphide The process of the invention may also include the following initial steps:

(a) An initial acidogenic fermentation step which, with complex wastes such as piggery waste, converts the proteins and carbohydrates in the waste to volatile fatty acids (VFA) and ammonia nitrogen. Some wastes (e.g. cheese whey) when fermented may be converted to lactic or other acids although some wheys already contain small concentrations of VFA.

(b) Acidification of the VFA (using industrial grade sulphuric acid) with the result that the bacterial pathogens which may be present are killed. Experiments carried out on piggery pilot plant liquor demonstrated that when $10^7$ *Salmonella typhimurium* organisms ml$^{-1}$ were introduced into a liquor containing 150 mM of VFA at 30° C. and pH 4.3, none could be detected after 3 hours. Counts of $10^7$ *Escherichia coli* in liquor containing 150 mM of VFA at 30° C. were reduced to zero after 3 hours had elapsed.

(c) The indigestible lignocellulose sludge from piggery waste may then be removed by screen, filtration or centrifugation. It is possible to deal with the stabilised sludge in a variety of ways, i.e.:

(1) the VFA-rich, ammonia nitrogen-rich liquor, freed of bacterial pathogens and sludge, is fed onto a curtain assembly of the invention inoculated with pellicle-forming yeasts or fungi relevant to the particular waste being treated.

These organisms utilize the VFA and ammonia nitrogen. Being oxidative organisms, they deodorize the liquor; or (2) wastes which are already fermented, as part of a production process (e.g. brewery and distillery wastes), can be fed directly onto a microbial curtain assembly of the invention to be utilized by pellicle-forming yeasts or fungi.

(d) Subsequently the yeasts or fungi are self-sloughed from the curtain and some can be harvested.

Thereafter, the biomass, self-sloughed from the microbial curtain and harvested, is known to have biological value as a fodder protein.

EXAMPLES

Example 1

Piggery waste

The serial fermentation of piggery wastes is efficient and stable. As well as converting the waste to volatile fatty acids and ammonia nitrogen, precipitation of some calcium and phosphorus has been demonstrated as has destruction of pathogenic bacteria. An additional feature postulated before work began, but since substantiated, is that the process can be used to monitor feed efficiency in the piggery. Defective feed preparation at the feed mill (excess uncracked grain in the ration), feed spills, and vomiting and diarrhoea in the pigs have all been identified from the functioning of the waste treatment process. Feed wastage has been reduced by 4%. This is significant in an agribusiness operation with an annual feed cost of $4,000,000.

Example 2

Brewery waste

While the treatment of strong brewery waste was being investigated, a filamentous organism, *Geotrichum fragrans*, was isolated from the effluent drains of a brewery. It grew vigorously as a pellicle on strong brewery waste, and it adhered to the curtain material.

TABLE 1

Analyses of strong brewery waste during passage down 3 × 2 m of microbial curtain.
One volume of feed was passaged in sequence through a first, second and third curtain and analyses for COD and BOD were carried out.

|  | COD mgL$^{-1}$ | BOD mgL$^{-1}$ |
| --- | --- | --- |
| Feed | 52990 | 34400 |
| First curtain | 13390 | 7910 |
| Second curtain | 6940 | 3300 |
| Third curtain | 4890 | 720 |
| % reduction | 91 | 98 |

Figure 5:
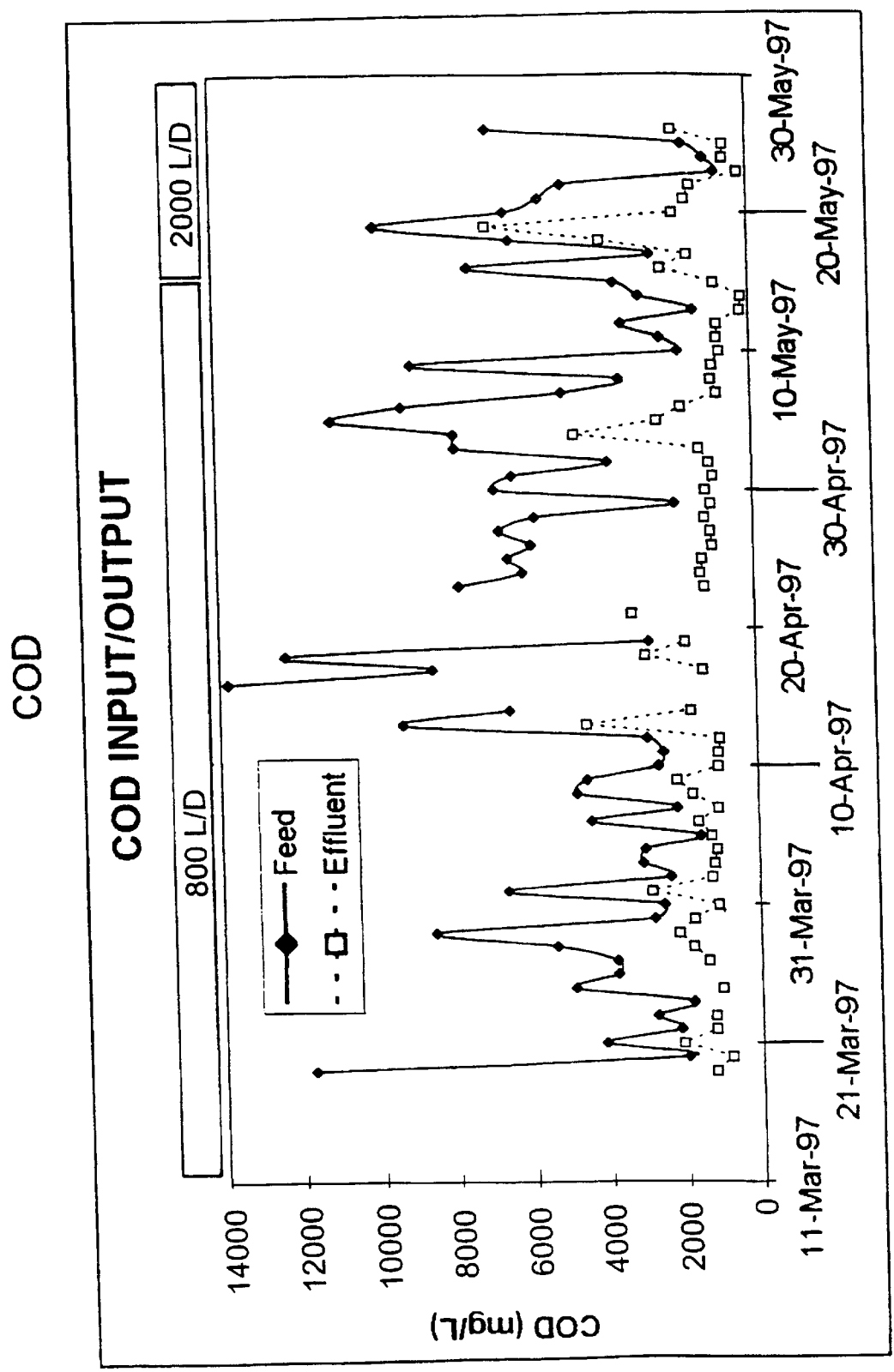
Figure 6:
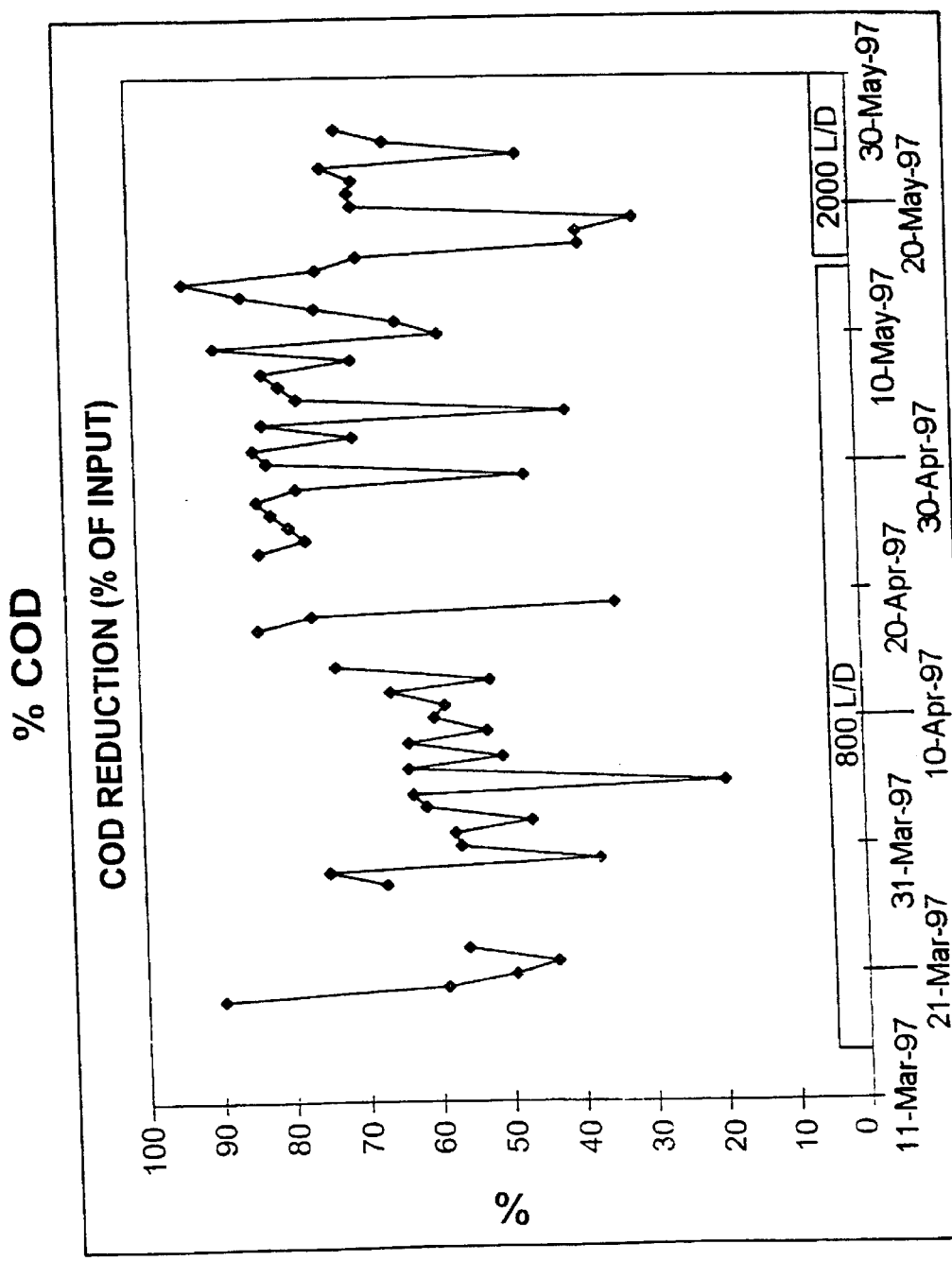

In a pilot plant concerning treatment of brewery waste the feed rate was 2000 Ld$^{-1}$. The waste was of extremely variable quality, the concentration of COD varied from <1000 to ~14,000 mgL$^{-1}$ and pH varied from 3.5–8.0. A graphical report of this operation is included as FIGS. 5 and 6.

Example 3

Waste from flavoured carbonated water manufacture

A study was carried out on this waste, a sample of which when supplied contained a COD of 1500 mgL$^{-1}$. The raw waste in a stirred beaker grew a pellicle as did a portion of the sample which was acidogenically fermented. The COD was reduced by 87% and 85% respectively. Passage of the waste over a laboratory scale curtain reduced the COD by 85%.

Example 4

Cheese whey

Studies on wheys derived from cheddar and cottage cheese manufacture have been carried out at laboratory scale. These wastes have COD values ~60,000–80,000 mgL$^{-1}$. COD reductions of 90% have been recorded. A preliminary fermentation is indicated so that much of the lactose is converted to lactic acid. This reduces the pH of the whey and thereby enhances the growth of *C. ingens* which then reduces the COD/BOD of the waste stream. The low pH also reduces aerobic bacterial growth and associated slime production. *C. ingens* is a versatile organism as it is able to utilize most organic acids including amino acids.

The laboratory scale studies have determined specific oxidation rate, oxygen required for treatment of the daily waste stream, the curtain area required, and from that, the footprint area of the treatment module.

What is claimed is:

1. A method of waste treatment which includes the steps of:

(i) inoculating one or more vertically oriented curtains formed of flexible mesh material having an aperture size of 0.1–5.0 mm with micro-organisms which are pellicle forming oxidative organisms so as to form a microbial lawn or mat adhering to the curtain;

(ii) passing waste liquid downwardly through the curtain; and (iii) collecting treated waste liquid below the curtain.

2. A method as claimed in claim 1 wherein there is provided a plurality of spaced curtains each separated by a spacing of 30–100 mm.

3. A method as claimed in claim 2 wherein each curtain is draped over a horizontal support.

4. A method as claimed in claim 2 wherein pressurized air is passed into the spacing between each curtain.

5. A method as claimed in claim 4 wherein the pressurized air is heated to a cultivation temperature of the microorganisms between 28–42° C.

6. A method as claimed in claim 5 wherein the pressurized air is heated to 32° C.

7. A method as claimed in claim 2 wherein the plurality of curtains is enclosed by a housing and the waste liquid is applied as a pressurized spray or jet to the curtains within the housing above said curtains.

8. A method as claimed in claim 7 wherein in step (iii) the treated waste liquid is collected in a drainage compartment of the housing and is subsequently pumped up a transfer conduit to form said pressurized spray or jet.

9. A method as claimed in claim 1 wherein there is provided a multiplicity of housings each containing a plurality of curtains which are separated by a spacing of 30–100 mm and each housing has a drainage compartment for collection of treated liquid waste after passage through said plurality of curtains whereby said treated liquid waste may be pumped through a transfer conduit to form a pressure spray above said plurality of curtains for discharge onto said plurality of curtains and each drainage compartment is in flow communication with each other for transfer of waste liquid.

10. A method as claimed in claim 9 wherein waste liquid is discharged from each drainage compartment into a common manifold for passage to a centrifuge or other means for removal of solid detritus before transfer of decanted waste liquid to one of said drainage compartments.

11. A method as claimed in claim 9 wherein waste liquid is transferred from one drainage compartment to an adjacent drainage compartment under the influence of gravity.

12. A method as claimed in claim 1 wherein the microorganisms are pellicle-forming oxidative organisms selected from the group consisting of *Candida ingens* and *Geotrichum fragans*.

13. A waste treatment apparatus including:
(i) one or more vertically oriented curtains each formed of flexible mesh material having an aperture size range of 0.1–5.0 mm;
(ii) means for applying liquid waste to said curtain(s) located above said curtain; and
(iii) collection means for collection of treated waste after passage through said one or more curtains.

14. Waste treatment apparatus as claimed in claim 13 wherein the mesh material is formed from commercial shadecloth having 50–90% UV cover factor.

15. Waste treatment apparatus as claimed in claim 13 wherein there is provided a plurality of curtains which are separated by a spacing of 30–100 mm.

16. Waste treatment apparatus as claimed in claim 15 wherein spacers are located between each curtain to maintain each curtain in a fixed orientation and wherein said spacing is maintained at a constant value.

17. Waste treatment apparatus as claimed in claim 16 wherein each curtain is tensioned adjacent a bottom edge to maintain each curtain in a taut and substantially planar condition.

18. Waste treatment apparatus as claimed in claim 17 wherein each curtain has a tie which is looped around or attached to a support.

19. Waste treatment apparatus as claimed in claim 13 wherein the means for applying the liquid waste comprises a nozzle wherein the liquid waste is applied as a pressurized spray or jet, a transfer conduit and a pump for pumping the waste liquid up the transfer conduit.

20. Waste treatment apparatus as claimed in claim 15 wherein there is provided means for passing pressurized air into each spacing.

21. Waste treatment apparatus as claimed in claim 20 wherein said means comprises a manifold having a plurality of inlet ports for passage of pressurized air.

22. Waste treatment apparatus as claimed in claim 21 wherein there is also provided a manifold having a plurality of exhaust ports for passage of exhausted air after passing between each spacing.

23. Waste treatment apparatus as claimed in claim 20 wherein there is provided means for heating the pressurized air to a temperature of 28–42° C.

24. Waste treatment apparatus as claimed in claim 15 wherein there is provided a housing for said plurality of curtains where the housing also contains a pressurized outlet for discharge of liquid waste in the form of a spray or jet above the curtains, a transfer conduit for transfer of waste liquid to the outlet and a pump for pumping the liquid up the transfer conduit.

25. Waste treatment apparatus as claimed in claim 24 wherein the housing comprises collection means in the form of a drainage compartment below the curtains for collection of treated waste.

26. Waste treatment apparatus as claimed in claim 25 wherein the transfer conduit extends from the drainage compartment to a location above the plurality of curtains.

27. Waste treatment apparatus as claimed in claim 24 wherein there is provided a plurality of said housings in series whereby waste liquid may be transferred sequentially from a first housing to a final housing or alternatively from a first housing to a final housing through one or more intermediate housings.

28. Waste treatment apparatus as claimed in claim 27 wherein there is provided transfer conduits between adjacent drainage compartments of each housing.

29. Waste treatment apparatus as claimed in claim 27 wherein liquid waste is discharged from each drainage compartment into a common manifold for ultimate transfer to a centrifuge or other means for removal of solids wherein decanted liquid is returned to a particular drainage compartment.

\* \* \* \* \*